United States Patent [19]
Rowlands et al.

[11] Patent Number: 6,100,381
[45] Date of Patent: Aug. 8, 2000

[54] ENZYME METHOD OF MANUFACTURING GELATIN

[75] Inventors: Anne G. Rowlands, Honeoye Falls; Deborah J. Burrows, Rochester, both of N.Y.

[73] Assignee: Eastman Kodak Company, Rochester, N.Y.

[21] Appl. No.: 09/185,440

[22] Filed: Nov. 3, 1998

[51] Int. Cl.⁷ .............................. C07K 1/00; C07K 14/00
[52] U.S. Cl. ............................................ 530/355; 435/273
[58] Field of Search .................................. 530/354, 355; 435/265, 273

[56] References Cited

U.S. PATENT DOCUMENTS

| | | |
|---|---|---|
| 2,761,791 | 9/1956 | Russell . |
| 3,508,847 | 4/1970 | Martin . |
| 3,539,644 | 11/1970 | Burness et al. . |
| 4,064,008 | 12/1977 | Peterson et al. . |
| 4,220,724 | 9/1980 | Berg et al. ............................... 435/273 |
| 4,824,929 | 4/1989 | Arimatsu et al. . |
| 5,034,249 | 7/1991 | Reif et al. . |

FOREIGN PATENT DOCUMENTS

| | | |
|---|---|---|
| 257515 | 3/1998 | European Pat. Off. . |
| 1 540 607 | 2/1979 | United Kingdom . |
| 94/21739 | 9/1994 | WIPO . |

OTHER PUBLICATIONS

Research Disclosure, Dec. 1989, No. 308119.

*Primary Examiner*—Nathan M. Nutter
*Attorney, Agent, or Firm*—Carl F. Ruoff; Doreen M. Wells

[57] ABSTRACT

The present invention is a process for the manufacture of gelatin which includes providing a collagen containing material and demineralizing the collagen containing material to produce ossein. An enzyme solution containing protease at a concentration of at least 10 ppb is added to the ossein for a time sufficient to solubilize the ossein to produce a solution containing the gelatin at a weight percent of from 0.5 to 6 and at a predetermined viscosity.

11 Claims, No Drawings

ENZYME METHOD OF MANUFACTURING GELATIN

CROSS REFERENCE TO RELATED APPLICATIONS

This application relates to commonly assigned application Ser. No. 09/186,433, and now U.S. Pat. No. 5,919,906 filed simultaneously herewith. This application relates to commonly assigned copending application Ser. No. 09/185,441, filed simultaneously herewith. This application relates to commonly assigned copending application Ser. No. 09/185,209, filed simultaneously herewith.

FIELD OF THE INVENTION

The present invention relates to the production of gelatin. More, particularly the present invention provides a method of extracting high quality gelatin from collagen containing material.

BACKGROUND OF THE INVENTION

In the manufacture of photographic films and papers, a support is commonly coated with multiple layers. The different layers have different individual functions in the final product, and in many instances it is necessary that the layers remain distinct and not mix with one another. For example, a simple color photographic film can have a subcoating, a blue-sensitive layer, a green- sensitive layer, a red-sensitive layer, one or more color filtering coatings, etc. Films with about 15 layers have been described, e.g. in EP 257,515, herein incorporated by reference.

In forming photographic elements, the layers can be applied to the support by various procedures known in the art. For example, the layers can be applied by dip coating, roller coating, spray coating, bead coating, and the like.

Two or more layers can be simultaneously applied as illustrated by U.S. Pat. Nos. 2,761,791, 3,508,847, 3,539,644, and such other patents cited in Research Disclosure No. 308, December 1989, pp. 1007–8 herein incorporated by reference. There, coating and drying procedures are discussed.

High purity gelatins are generally required for imaging applications. Currently the manufacturing process for obtaining high purity gelatins involves demineralization of bone, followed by extended alkaline treatment (liming) and finally gelatin extraction with water of increasing temperature. This process commonly referred to as alkaline processed ossein has existed with various modifications throughout the gelatin industry for a number of years. The liming step of this process requires up to 60 days, the longest step in the approximately 3 month process of producing gelatin. The extended time required by the current limed ossein process for producing gelatin results in the need for increased inventories of the gelatin product. U.S. Pat. No. 4,824,929, incorporated by reference herein describes a suitable process for demineralizing bone.

This invention describes a novel process for the production of high purity gelatin utilizing the action of proteolytic enzymes for extraction of gelatin from demineralized ossein. The enzyme method of manufacturing gelatin described here produces gelatin with very low color and high gel strength over a wide range of viscosities. This high purity enzyme extracted gelatin is produced with a dramatic reduction in gelatin manufacturing cycle time due to elimination or shortening of a liming step. Further, the low temperature enzyme method of manufacturing gelatin results in lower unit manufacturing costs due to increased yield, reduced chemical costs, reduced water usage, and reduced utility costs.

SUMMARY OF THE INVENTION

The present invention is a process for the manufacture of gelatin which includes providing a collagen containing material and demineralizing the collagen containing material to produce ossein. An enzyme solution containing protease at a concentration of at least 10 ppb is added to the ossein for a time sufficient to solubilize the ossein to produce a solution containing the gelatin at a weight percent of from 0.5 to 6 and at a predetermined viscosity.

DETAILED DESCRIPTION OF THE INVENTION

The present invention describes a process for the manufacture of gelatin from collagen containing material utilizing proteolytic enzymes to extract gelatin. A collagen containing material demineralized to produce ossein is homogenized or ground and added to a solution of protease for sufficient time to extract gelatin at a predetermined viscosity. It is preferred that the ossein be ground to a size of less than 0.25 inches. The concentration of protease is at least 10 ppb, preferably 100 ppb and most preferably at least 1 ppm. Following extraction the gelatin may be clarified, filtered, oxidized or deionized to achieve desired levels of microconstituents, prior to concentration and drying. The rate of enzyme action on ossein is a function of enzyme concentration, pH, temperature and time. Optimization of these factors is enzyme dependent.

Typical collagen containing materials include skins, bones, hides and connective tissue of an animal body. Sources of animal bodies include cows, pigs and sheep. The most preferred source for collagen for production of high quality gelatin is cow bone.

Due to variable bond breakage during manufacture, gelatin is composed of a distribution of proteins of varying lengths. Aqueous size exclusion chromotagraphy provides a method of analysis for determining the gelatin molecular weight distribution. This distribution is described as containing the following fractions; high molecular weight or HMW (>250 daltons); Beta (250–150 Kdaltons); Alpha (150–50 Kdaltons); Subalpha (50–20 Kdaltons); and low molecular weight or LMW (20–4 Kdaltons). In general, high gel strength correlates with high gelatin alpha fraction content, and high viscosity correlates with high gelatin HMW fraction content.

Enzymes are biological catalysts. Similar to traditional chemical catalysts, enzymes speed the rate of biological reactions by producing a transition state with a lower energy of activation than the uncatalyzed reaction. Unlike traditional chemical catalysts, enzymes are biological in nature. Enzymes are proteins specialized for the reactions they catalyze. In other words enzymes exhibit substrate specificity. Proteases are enzymes that catalyze the hydrolysis of peptide bonds in proteins and peptides. Proteases are available from Genecor International or Novo Nordisk.

Enzymes are irreverisbly inactivated by agents or processes which covalently and permanently modify the active site of the enzyme. Typically, reactions which denature proteins achieve this affect. For example extremes in pH or elevated temperatures.

Purification of enzyme extracted gelatin can be varied to achieve the desired level of microconstitutents. Filtration can be combined with deionization, oxidation, or a clarification process. The gelatin can be further clarified through flocculation which removes non-gelatin proteins and lipids. Following purification, sequential enzyme produced gelatin extractions may be blended in liquid form prior to concentration. Concentration is achieved through an evaporative process. Concentrated gelatin can be used in liquid form, chilled or dried.

The present invention is illustrated by the following examples.

EXAMPLE 1
Gelatin from enzyme extraction of ossein

Ossein from cow bone was ground to 0.125 inches, adjusted to pH 11 and added to a solution containing 1 ppm Protex 6L (Genencor International), a protease, at 50° C. for a time sufficient (approximately 8 to 15 hours) to extract gelatin. Protex 6L was deactivated by elevating the temperature of the extracts to 100C for 1 minute. Following extraction all fractions were pooled, clarified, filtered, concentrated and dried. The gelatin obtained (E1) is described below.

|  | Gelatin E1 |
| --- | --- |
| Molecular Weight Fractions |  |
| HMW | 10.01 |
| BETA | 12.06 |
| ALPHA | 38.96 |
| A420 | 1.17 |
| Viscosity (cps) | 5.3 |
| Gel Strength (g) | 335 |

EXAMPLE 2
Gelatin from enzyme extraction of partially limed ossein

Partially limed ossein (11 days in lime) from cow bone was ground to 0.125 inches, adjusted to pH 7 and added to a solution containing 1 ppm Protex 6L (Genencor Internaltional) at 50° C. for a time sufficient to extract gelatin. Protex 6L was deactivated by elevating the temperature of the extracts to 100° C. for 1 minute. Following extraction all fractions were pooled, clarified, filtered, concentrated and dried. The gelatin obtained (E2) is described below.

|  | Gelatin E2 |
| --- | --- |
| Molecular Weight Fractions |  |
| HMW | 2.59 |
| BETA | 6.66 |
| ALPHA | 31.57 |
| A420 | 0.081 |
| Viscosity (cps) | 4.49 |
| Gel Strength (g) | 275 |

EXAMPLE 3
Gelatin from enzyme extraction of fully limed ossein

Fully limed ossein from cow bone was ground to less than 0.125 inches, adjusted to pH 9 and added to a solution containing 2 ppm Neutrase (Novo Nordisk), a protease, at 50° C. for a time sufficient to extract gelatin. Neutrase was deactivated be elevating the temperature of the extracts to 100° C. for 1 minute. An extraction profile of molecular weight distribution is shown below.

|  |  |  |  | % cumulative yield | |
| --- | --- | --- | --- | --- | --- |
| Fraction | HMW | Beta | Alpha | per ossein | per bone |
| 1 | 10.93 | 13.31 | 45.35 | 7.1 | 1.7 |
| 2 | 8.71 | 11.08 | 39.8 | 16.5 | 3.96 |
| 3 | 3.55 | 7.47 | 35.19 | 28.7 | 6.89 |
| 4 | 1.43 | 4.18 | 27.48 | 42.1 | 10.1 |
| 5 | 0.83 | 2.54 | 20.76 | 57.4 | 13.78 |
| 6 | 0.72 | 1.88 | 16.94 | 72 | 17.28 |
| 7 | 1.02 | 2.54 | 19.57 | 81 | 19.4 |
| 8 | 0.64 | 1.67 | 16.68 | 89.3 | 21.43 |
| 9 | 0.7 | 1.88 | 17.53 | 96 | 23.04 |

Gelatin content in the starting fully limed ossein was determined by amino acid analysis and compared to the amount of extracted gelatin to calculate a gelatin yield of 96%. Assuming a theoretical maximum yield of 24% gelatin from bone, 96% yield form ossein predicts an approximate yield of 23% gelatin based on weight of bone.

A comparison extraction profile from lime processed ossein extracted with temperature controlled water is shown below. This example illustrated the referred to alkaline processed ossein method of gelatin manufacture common in the gelatin manufacturing industry today. Gelatin was extracted from fully limed cow bone ossein by increasing water temperature. The molecular weight distribution of extracted gelatin and the cumulative yield are shown below. Cumulative yield in this chart is expressed as % gelatin yield per starting bone weight.

| Fraction | HMW | Beta | Alpha | % cumulative yield |
| --- | --- | --- | --- | --- |
| 1 | 19.64 | 16.76 | 52.63 | 1.15 |
| 2 | 20.66 | 17.82 | 52.57 | 2.27 |
| 3 | 20.8 | 18.39 | 52.31 | 3.49 |
| 4 | 22.64 | 17.52 | 48.79 | 4.51 |
| 5 | 22.93 | 17.53 | 48.73 | 5.49 |
| 6 | 25.06 | 17.59 | 46.55 | 6.66 |
| 7 | 26.95 | 17.69 | 44.78 | 7.86 |
| 8 | 29.42 | 17.76 | 42.07 | 9.05 |
| 9 | 30.92 | 17.6 | 39.1 | 10.09 |
| 10 | 37.21 | 16.74 | 33.91 | 12.34 |
| 11 | 37.08 | 16.76 | 33.62 | 13.96 |
| 12 | 39.58 | 16.84 | 29.31 | 15.7 |

The present invention shows that gelatin can be extracted more efficiently using protease enzymes than with prior art extraction techniques. An increase in yield to 23 from 15.7 percent has been provided. Moreover the gelatin extracted meets the demanding requirements for photographic applications.

After extraction, the gelatin can be clarified, concentrated, deionized, oxidized, chilled or dried. For certain applications it is preferred to blend the gelatin extracts prior to concentrating. For certain applications it is preferred to oxidize the gelatin with hydrogen peroxide prior to concentrating. The gelatin can be clarified by adding lime (5–7 BE or degrees Baume) (6 degrees Baume is equivalent to 53.8 g CaO/liter) to achieve a pH of 9.0, followed by addition of aluminum sulphate (25%) to reduce the pH to 7.5 and addition of phosphoric acid (10%) to reduce the pH to 5.5. A floating floc is formed by the addition of polyacrylamide polymer (10% w/v) to the gelatin solution and the floc is removed.

Molecular weight distribution of gelatin was determined by high-performance liquid chromatography in the aqueous size exclusion mode. Gelatin samples were dissolved in the chromatographic eluent, a phosphate buffer containing sodium dodecyl sulfate. Different molecular weight fractions were separated on a Toso Haas TSK Gel size exclusion column and the effluent monitored with a UV detector set at 220 nm. Known molecular weight standards were used to prepare a calibration curve, which was constructed by plotting the log of molecular weight versus retention time. The molecular weight distribution of unknown gelatin samples were determined from the linear portion of this calibration curve. Amino Acid content of gelatin was determined using the method of Spackman, Stein and Moore, Analyt. Chem., 30:1190 (1958).

The process and materials of this invention can be used for any imaging material using gelatin. For example, they can be used for color photographic materials such as color photographic negative films, color photographic reversal films, color photographic positive films, color photographic papers, color photographic reversal papers, and color photographic materials for a color diffusion transfer system and a silver dye bleach system, and for black—and—white photographic materials such as black-and-white photographic films, radiographic films, graphic films, black-and-white photographic papers, navigational photographic films, microfilms, facsimile films, photocomposing films or papers, graph films, etc. Ink jet applications are also contemplated.

Also, gelatin to which this invention is applied may be, if necessary, partially replaced with colloidal albumin, casein, cellulose derivatives (e.g., carboxymethyl cellulose, hydroxyethyl cellulose, etc.), sugar derivatives (e.g., agar agar, sodium alginate, starch derivatives, etc.), and synthetic hydrophilic colloids (e.g., polyvinyl alcohol, poly-N-vinyl pyrrolidone, polyacrylic acid copolymers, polyacrylamide, and derivatives or partially hydrolyzed products thereof) as well as gelatin derivatives modified by the treatment of an amino group, an imino group, a hydroxy group, or a carboxy group contained in the gelatin molecule as a functional group with a reagent having one group capable of reacting the group, or a gelatin graft polymer prepared by bonding gelatin to the molecular chain of another polymeric material.

The invention has been described in detail with particular reference to certain preferred embodiments thereof, but it will be understood that variations and modifications can be effected within the spirit and scope of the invention.

What is claimed is:

1. A process for the manufacture of gelatin comprising:
   providing a collagen containing material;
   demineralizing the collagen containing material to produce ossein; and
   adding an enzyme solution containing protease at a concentration of at least 10 ppb to the ossein for a time sufficient to solubilize the ossein to produce a solution containing the gelatin at a weight percent of from 0.5 to 6.

2. The process of claim 1 further comprising:
   deactivation of the enzyme with elevated temperature or pH adjustment.

3. The process of claim 1 further comprising:
   clarifying the gelatin solution.

4. The process of claim 3 wherein the step of clarifying the gelatin solution comprises:
   raising the pH of the gelatin solution to greater than 9.0;
   adding aluminum sulfate to the gelatin solution to reduce the pH to 7.5;
   adding phosphoric acid to the gelatin solution to reduce the pH to 5.5:
   oxygenating the gelatin solution;
   adding polyacrylamide polymer to the gelatin solution in an amount of about 0.1 percent based on the dry weight of the gelatin to produce a floating floc;
   removing the floating floc; and
   filtering the reacted mixture to produce gelatin.

5. The process of claim 3 further comprising:
   concentrating the gelatin.

6. The process of claim 1 further comprising:
   grinding the ossein to a size of less than 0.25 inches after demineralizing.

7. The process of claim 1 further comprising:
   liming the ossein in a suspension of calcium hydroxide for periods of 1–100 days after demineralizing.

8. The process of claim 1 further comprising:
   oxidizing the gelatin with hydrogen peroxide prior to concentrating.

9. The process of claim 1 further comprising:
   deionizing the gelatin prior to concentrating.

10. The process of claim 1 further comprising:
    filtering the gelatin prior to concentrating.

11. The process of claim 1 wherein the collagen containing material is selected from the skins, bone, hide and connective tissue of animals.

* * * * *